United States Patent [19]

Hödl et al.

[11] Patent Number: 4,863,150
[45] Date of Patent: Sep. 5, 1989

[54] DEVICE FOR ACTUATING TOOLS, IN PARTICULAR, CLAMPING MEANS, SUBJECT TO THE APPLICATION OF PRESSURE

[75] Inventors: Otto Hödl, Rodgau; Hans J. Klein, Maintal, both of Fed. Rep. of Germany

[73] Assignee: De-Sta-Co Metallerzeugnisse Gmbh, Frankfurt, Fed. Rep. of Germany

[21] Appl. No.: 172,564

[22] Filed: Mar. 24, 1988

[30] Foreign Application Priority Data

Mar. 28, 1987 [DE] Fed. Rep. of Germany ... 8704628[U]

[51] Int. Cl.$^4$ .............................................. B23Q 7/00
[52] U.S. Cl. ...................................... 269/56; 269/25; 269/304; 269/329
[58] Field of Search ................. 269/56, 55, 309–310, 269/20, 25, 329, 99–100; 198/345; 83/364, 451, 360

[56] References Cited

U.S. PATENT DOCUMENTS

| | | | |
|---|---|---|---|
| 4,092,887 | 6/1978 | Brower | 269/56 |
| 4,468,019 | 8/1984 | Staudenmaier | 269/56 |
| 4,664,364 | 5/1987 | Lymburner | 269/329 |
| 4,693,458 | 9/1987 | Lewecke et al. | 269/329 |
| 4,697,799 | 10/1987 | Wickham et al. | 269/329 |

Primary Examiner—Robert C. Watson
Attorney, Agent, or Firm—Kurt Kelman

[57] ABSTRACT

The invention provides a device for actuating a clamping tool means by fluid pressure and for monitoring the fluid pressure, which comprises a carrier for a workpiece and the clamping tool means, a first mounting element on the carrier, a second mounting element, and means for detachably coupling the second mounting element to the first mounting element. A pressure fluid conduit system is connected to a fluid pressure generator and includes a first fluid pressure conduit in the first mounting element, a second fluid pressure conduit in the second mounting element, detachable connections between the first and second fluid pressure conduits, the detachable connection in the first fluid pressure conduit including a check valve retaining the fluid pressure in the first fluid pressure conduit when the second fluid pressure conduit is detached, and a third fluid pressure conduit connecting the first fluid pressure conduit to the clamping tool means. A push-button switch including a switching element is in direct communication with the first fluid pressure conduit and is responsive to a predetermined decrease in the fluid pressure retained therein, and a pressure signal generator is operated by the push-button switch for emitting a signal upon actuation of the switching element in response to the fluid pressure decrease.

7 Claims, 2 Drawing Sheets

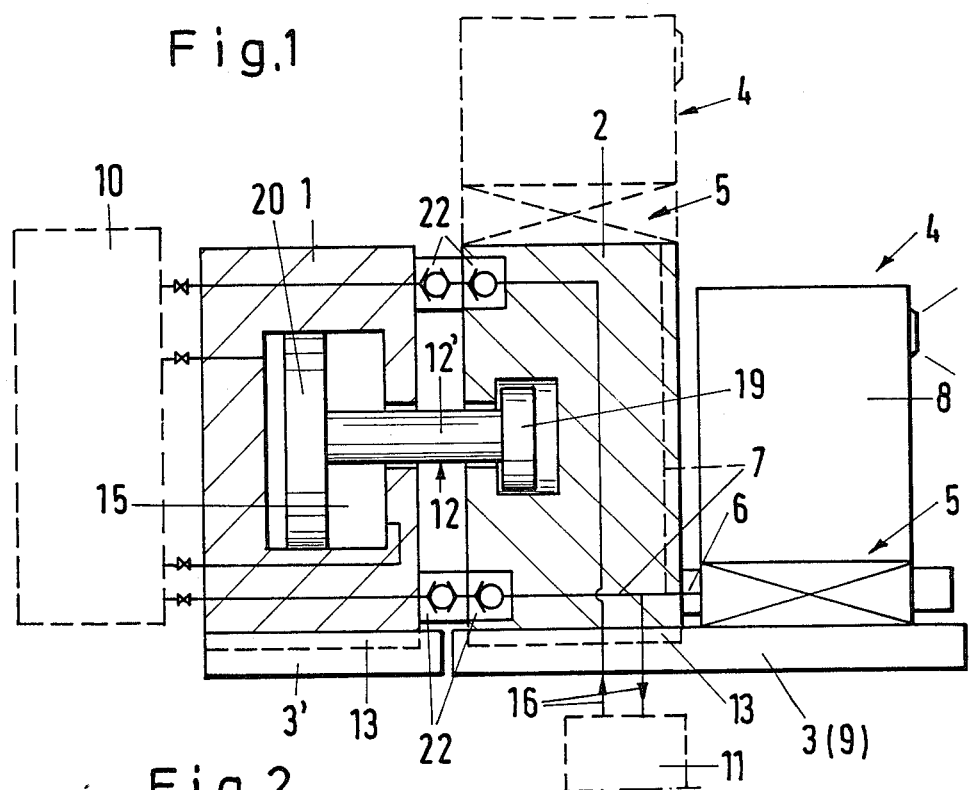
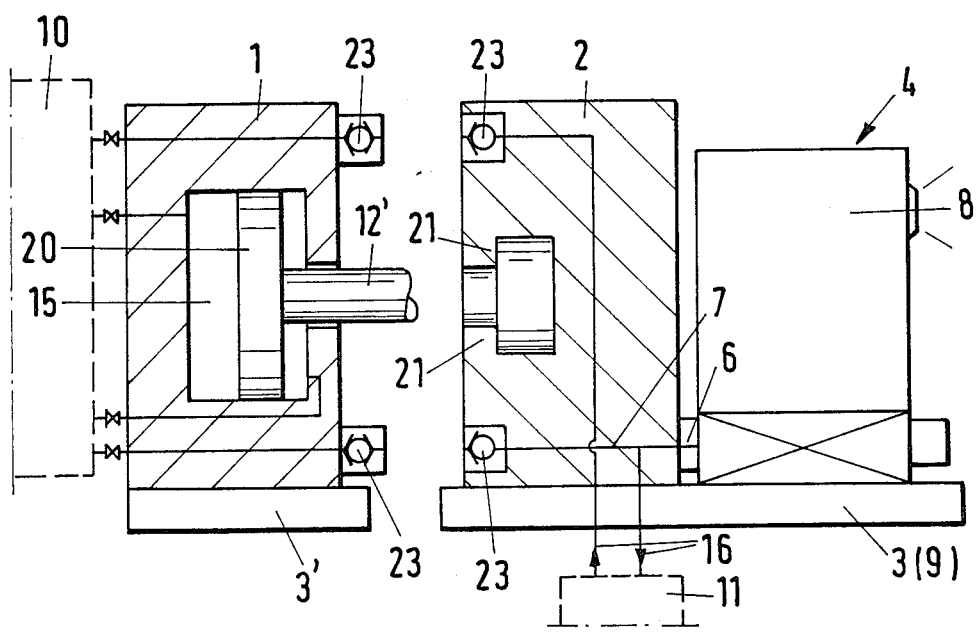

DEVICE FOR ACTUATING TOOLS, IN PARTICULAR, CLAMPING MEANS, SUBJECT TO THE APPLICATION OF PRESSURE

The present invention relates to a device for actuating tools, in particular, clamping means, subject to the application of pressure, and for monitoring the operating pressure, using mounting elements and an adjustable pushbutton switch.

BACKGROUND OF THE INVENTION

The afore-mentioned elements, viz. so-called mounting elements, pushbutton switches and auxiliary tools, such as clamping means, are adequately known and in use with work processing so that no detailed description of such elements is necessary.

Modern production plants operate with so-called work pallets on which the workpieces to be processed are clamped by suitable clamping means. During processing of the workpiece(s) on one pallet, a second pallet is usually loaded with workpieces and held on stand-by. Once the workpieces of the first pallet are processed, the first pallet is moved out of the processing station and the second stand-pallet is moved in for being processed. Subsequently, the operators will remove the finished workpieces from the moved-out pallet and reload the pallet with workpieces to be processed, it being desirable to perform the clamping of the workpieces on the pallets through a pressure medium, preferably hydraulically, to attain a uniformly repeatable pressure for a uniform and precise processing. One problem resides in that it is not possible to provide each pallet with a hydraulic aggregate and that means will have to be provided to hold the hydraulically locked clamping elements in their clamping position after the hydraulic aggregate has been disconnected. During processing of the workpieces in the processing station, care must be taken to prevent the clamping pressure from dropping since otherwise damage would be done to the expensive facilities of the processing station. Hitherto, this problem was solved by so-called pressure accumulator units, with a hydraulic accumulator being disposed between the hydraulic aggregate and the hydraulic clamping elements which, after disconnection of the hydraulic aggregate, compensates for any pressure fluctuations caused e.g. by temperature differences. However, such accumulations frequently fail due to their low storage capacity or in the event of leakage in the system. Attempts have frequently been made in the past to insure early identification of any pressure losses, by means of pressure control switches to preclude damage, especially to the expensive tools of the processing machine. Although the operation of such switches is satisfactory, this solution, on the one hand, involves substantial efforts as corresponding systems operate on pressure accumulators on the workpiece pallets or, on the other hand, the pressure control switches must be directly wired to the control of the processing machine.

It is, therefore, an object of the invention to provide a compact device, especially one not requiring a pressure accumulator and, hence, needing little space, to which one or more auxilary tools, such as clamping means actuatable by fluid pressure may be connected and which is capable of acting, in the event of a predetermined pressure decrease, on the processing machine, without wiring the device to the machine.

SUMMARY OF THE INVENTION

This object is accomplished according to the invention with a device for actuating a clamping tool means by fluid pressure and for monitoring the fluid pressure, which comprises a carrier for a workpiece and the clamping tool means, a first mounting element on the carrier, a second mounting element, and means for detachably coupling the second mounting element to the first mounting element. A pressure fluid conduit system is connected to a fluid pressure generator and includes a first fluid pressure conduit in the first mounting element, a second fluid pressure conduit in the second mounting element, detachable connections between the first and second fluid pressure conduits, the detachable connection in the first fluid pressure conduit including a check valve retaining the fluid pressure in the first fluid pressure conduit when the second fluid pressure conduit is detached, and a third fluid pressure conduit connecting the first fluid pressure conduit to the clamping tool means. A push-button switch including a switching element is in direct communication with the first fluid pressure conduit and is responsive to a predetermined decrease in the fluid pressure retained therein, and a presure signal generator is operated by the push-button switch for emitting a signal upon actuation of the switching element in response to the fluid pressure decrease. This device of the invention combines all the elements in a compact and space saving unit, thus requiring little space on the tool table or on the pallet and being mountable as a compact unit. Moreover, the space-requiring and costly pressure accumulator is eliminated and leakage points, if any, are minimzed.

According to a preferred feature, the signal generator is configured in the form of an HF-transmitter as it permits establishment of a wireless signal connection for controlling or switching the processing machine, with the pressure once built up in the clamping system causing a permanent signal of the high-frequency transmitter which is interrupted upon a pressure decrease. This interruption is transmitted to the emergency stop switch of the processing station and immediately interrupts the processing in the event that the pressure should decrease.

In consideration of an easy mounting capability of the device, the carrier advantageously is configured as a pallet capable of being connected to the machine tool table or tool pallet. However, it is also possible to configure the carrier in the form of a work pallet, i.e. the elements forming the device, viz. the mounting element on the work side, the push-button switch and the signal generator, preferably in the form of an HF-transmitter, may be directly fixed on to the workpiece pallet.

BRIEF DESCRIPTION OF THE DRAWINGS

The device according to the invention will be described hereinbelow in greater detail in connection with a presently preferred embodiment shown in the drawing, in which:

FIG. 1 is a side view of the device, partly in section, with the associated mounting element coupled thereto;

FIG. 2 is a like side view of the device, partly in section, with the associated mounting element detached;

DESCRIPTION OF THE PREFERRED EMBODIMENT

Figure 3:
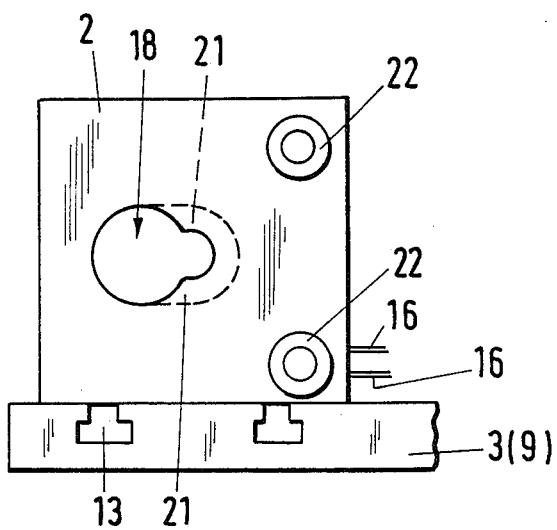
FIG. 3 is a front view of the mounting element on the work side of the device.

As shown in FIG. 1, two mounting elements 1 and 2 are detachably coupled in pressure-tight manner. Mounting element 2 is firmly disposed on a workpiece carrier 3 by means of connecting elements 13. Disposed on the said carrier 3 is, moreover, the push-button switch 5 provided with a signal generator 4, with the pressure connection 6 of the said switch 5 being in direct communication with conduit 7 exposed to the operating fluid pressure of the mounting element 2 disposed on the carrier 3. As shown, the bush-button switch 5 and the signal generator 4 configured as HF-transmitter 8 are combined to form a pressure actuated control and display unit which, in case of a predetermined pressure decrease conduit 7 resulting in an interruption of the permanent signal generated by the high-frequency transmitter 8 by push-button switch 5, immediately causes the switch-off of the processing machine 14 and of the processing tool 14' respectively. The carrier 3 to which the mounting element 1 is, of course, not attached, advantageously can be formed with a plate 3' connectible to a machine tool table or a tool pallet plate 3' is provided with connecting elements 13 for mounting element 1, which may be coupled to, and detached from, mounting element 2 by connecting element 12 comprising piston 20 and piston rod 12' reciprocably mounted on cylinder 15 which is in communcation with fluid pressure generator 10.

Figure 4:
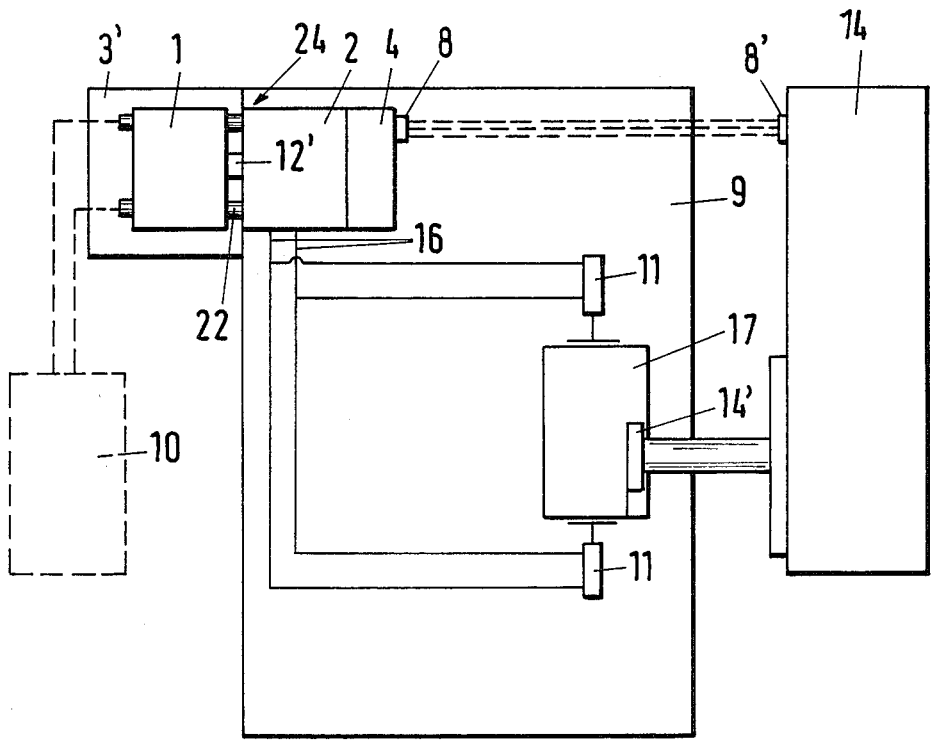
FIG. 4 is a plan view of the device, including workpiece clamping means connected thereto, a workpiece to be processed and a processing machine.

FIG. 4 shows carrier 3 formed as a relatively large workpiece pallet 9. The two pressure medium connections 16 of the mounting element 2 are in communication with one or more clamping means 11 on workpiece pallet 9 to retain the workpiece 17 to be processed, as equally illustrated in FIG. 4.

As shown in FIG. 3, the mounting element 2 is provided with an aperture 18 for receiving head 19 of piston rod 12'. For coupling the mounting elements, mounting element 1 is pushed slightly laterally and pressure is applied to the piston 20 in the mounting element 1 to anchor the head 19 on the undercuts 21 of the mounting element aperture 18, with the pressure medium connections 22 furnished with check valves 23 being coupled together in pressure-tight manner. The entire arrangement requires no pressure accumulator and the device operates as follows:

The pallet 9 is prepared outside the working range of the processing machine 14 with the processing tool 14' thereof. To clamp the workpiece 17 by means of the clamping unit 11, the carrier 3' with the mounting element 1 is coupled as described to the mounting element 2 and fluid pressure is applied by the pressure generator 10 to cylinder for coupling mounting element 1 to mounting element 2, and to conduit 7 and pressure medium connections 16 to clamp workpiece 17 in position carrier 3' along with the mounting element 1 is then decoupled, with check valves 23 closing, i.e. the pressure prevailing in conduits 7 and 16 is maintained, and the entire pallet, with the workpiece in the processing position, can be supplied to the processing tool 14', with transmitter 8, during the entire processing operation, generating a permanent signal received by receiver 8' on the processing machine 14. As transmitter 8, through the push button pressure connection 6 exposed to the fluid pressure in conduit 7, is in communication with the entire pressure system, any pressure decrease, results in an interruption of the permanent signal, thereby switching off the processing machine. While the pallet is—as shown in FIG. 4—in the processing position and the processing is accomplished, detached carrier 3' with its mounting element 1 is, readied for preparing the next pallet of corresponding configuration. If pallet 9 is large enough, a plurality of workpieces 17 can be disposed on it, with a corresponding number of clamping means 11 on the pallet 9. The mounting element 2 along with the signal generator 4 requires very little spce as this device can do without a pressure accumulator.

The mounting element 2 may be located in a corner area 24 of the pallet 9 in order to have available as much free space as possible on the pallet 9 for the accommodation of clamping means 11 and workpieces 17. For the same reason, the push-button switch 5 with the signal generator 4, advantageously, may—as shown in broken lines in FIG. 1—also be located on the mounting element 2 directly, with the conduit 7—as equally shown in broken lines—in that case being guided upwardly. While present exemplary embodiments of this invention, and methods of practicing the same, have been illustrated and described, it will be recognized that this invention may be otherwise variously embodied and practiced within the scope of the following claims.

What is claimed is:

1. A device for actuating a clamping tool means by fluid pressure and for monitoring the fluid pressure, which comprises
   (a) a carrier for a workpiece and the clamping tool means,
   (b) a first mounting element on the carrier,
   (c) a second mounting element,
   (d) means for detachably coupling the second mounting element to the first mounting element,
   (e) a fluid pressure generator,
   (f) a pressure fluid conduit system connected to the fluid pressure generator and including
      (1) a first fluid pressure conduit in the first mounting element,
      (2) a second fluid pressure conduit in the second mounting element,
      (3) detachable connections between the first and second fluid pressure conduits, the detachable connection in the first fluid pressure conduit including a check valve retaining the fluid pressure in the frist fluid pressure conduit when the second fluid pressure conduit is detached, and
      (4) a third fluid pressure conduit connecting the first fluid pressure conduit to the clamping tool means,
   (g) a push-button switch including a switching element in direct communication with the first fluid pressure conduit and responsive to a predetermined decrease in the fluid pressure retained therein, and
   (h) a pressure signal generator operated by the push-button switch for emitting a signal upon actuation of the switching element in respone to the fluid pressure decrease.

2. The device of claim 1, wherein the pressure signal generator is a high-frequency signal transmitter.

3. The device of claim 1, further comprising a machine tool table holding a machine tool capable of working on the workpiece, the machine tool table comprising a receiver for the emitted signal, the received signal causing the work of the machine tool to cease.

4. The device of claim 1, wherein the carrier is a pallet holding the workpiece and the first mounting element is arranged in a corner area of the pallet.

5. The device of claim 1, wherein the signal generator is mounted on the carrier.

6. The device of claim 1, wherein the signal generator is mounted on the first mounting element.

7. The device of claim 1, wherein the means for detachably coupling the second mounting element to the first mounting element comprises a piston mounted in the second mounting element and reciprocable by fluid pressure received from the fluid pressure generator, a piston rod having one end affixed to the piston for reciprocation therewith and a head affixed to an opposite piston rod end, and an undercut aperture in the first mounting element for detachably receiving the head and anchoring the head to the undercut aperture.

* * * * *

UNITED STATES PATENT OFFICE
CERTIFICATE OF CORRECTION

Patent No. 4,863,150  Dated September 5, 1989

Inventor(s) Otto HODL and Hans J. KLEIN

It is certified that error appears in the above-identified patent and that said Letters Patent is hereby corrected as shown below:

Cover page, column 1, item [73], line 1, delete "Gmbh" and substitute therefor --GmbH--.

Signed and Sealed this

Eighteenth Day of September, 1990

*Attest:*

HARRY F. MANBECK, JR.

*Attesting Officer*   *Commissioner of Patents and Trademarks*